US006943945B2

(12) United States Patent
Nakagawa et al.

(10) Patent No.: US 6,943,945 B2
(45) Date of Patent: Sep. 13, 2005

(54) TWO AXIS STATE FOR MICROSCOPE

(75) Inventors: Shuichi Nakagawa, Hitachinaka (JP); Eiichi Seya, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 10/825,131

(22) Filed: Apr. 16, 2004

(65) Prior Publication Data

US 2005/0018284 A1 Jan. 27, 2005

(30) Foreign Application Priority Data

Apr. 16, 2003 (JP) ....................................... 2003-110976

(51) Int. Cl.7 ................................................ G02B 21/26

(52) U.S. Cl. ........................ 359/393; 359/368; 359/391

(58) Field of Search ................................ 359/368, 383, 359/391–394, 813–814, 823–824, 819; 250/308–310, 442.11; 74/490.09

(56) References Cited

U.S. PATENT DOCUMENTS 5,149,967 A * 9/1992 Otaka ......................... 250/310
5,263,384 A * 11/1993 Suzuki .................... 74/490.13
5,323,712 A * 6/1994 Kikuiri ........................ 108/20
5,802,925 A * 9/1998 Kanao ..................... 74/490.13
5,812,310 A * 9/1998 Stewart et al. .............. 359/392
6,781,138 B2 * 8/2004 Novak et al. .......... 250/442.11

FOREIGN PATENT DOCUMENTS

JP 7-142558 * 2/1995

* cited by examiner

*Primary Examiner*—Thong Q. Nguyen
(74) *Attorney, Agent, or Firm*—Dickstein Shapiro Morin & Oshinsky LLP

(57) ABSTRACT

A two axis stage for microscopes that is thin, has reduced vibration, and is adapted for increased stage transportation speeds is capable of being disposed inside a chamber without changing a floor-projected area. The XY stage comprises a base 1, an X table 2 that can be moved in an X direction on the base 1 by an X feed screw 7, and a Y table 3 that is supported on the X table 2 and movable in a Y direction. A third table 4 is disposed on the base 1, the third table being movable in the Y direction by a Y-feed screw 8 positioned on the base 1. Additionally, a slide unit 14 is disposed on the third table 4, the slide unit 14 being movable in the X direction and connected with the Y table 3.

7 Claims, 6 Drawing Sheets

TWO AXIS STATE FOR MICROSCOPE

BACKGROUND OF THE INVENTION

Generally, the structure of the two axis (XY, for example) stage for microscopes has a reference base, an X table built on the base and movable in an X direction, and a Y table mounted on the X table and movable in Y direction perpendicular to the X direction. For the XY stage, rotary motors and feed screws are often used as actuators, as shown in JP Patent Publication (Kokai) No. 7-142558 A (1995). The actuator include similar feed mechanisms for both X and Y tables. Each feed mechanism consists of a nut unit that is fixed on a moving side, a feed screw that engages with the nut unit on the moving side and is rotatably and axially supported in the moving direction, and a motor to rotate the feed screw.

When using the XY stage in a chamber in which a specific atmosphere or vacuum is maintained, it is desirable that the motor be positioned outside the chamber for reasons of discharge, longer life, and maintenance. However, in the XY stage, it is difficult to position the motor outside the chamber because the Y table feed mechanism moves in the X direction along with the movement of the X table. Therefore, conventionally, as shown in FIG. 6, the movement of the Y table 31 in the Y direction is made possible by pushing and pulling a guide rail 37 positioned at the edge of the Y table 31 and slidable in the X direction, using a Y-drive shaft 36 connected with a Y feed screw 35 in a sub-chamber 33 disposed outside the chamber 32. In this way, the lateral difference between the Y table 31 and the Y feed screw 35 caused by the movement of the X table 30 can be eliminated. Numeral 29 designates a base, numeral 34 an X feed screw, numeral 38 an X drive motor, and numeral 39 a Y drive motor.

JP Patent Publication (Kokai) No. 7-142558 A (1995) discloses an XY stage comprising a stacked arrangement of an X-direction transport mechanism and a Y-direction transport mechanism.

In the XY stage disclosed in JP Patent Publication (Kokai) No. 7-142558 A (1995), the total height of the stage increases because the two tables, each with a feed mechanism for transporting in one axial direction, are stacked such that they move at right angles to each other. Further, the gravitational center of the entire stage is high because the feed mechanism for driving the Y table (upper table) is mounted on the X table, thereby reducing the mechanical resonance frequency of the stage. Also, there is a problem that the X table feed mechanism requires a powerful motor for fast movement because of the increased weight to be moved.

When using the XY stage in a chamber in which a specific atmosphere or vacuum is maintained, the method shown in FIG. 6, in which the sub-chamber 33 is provided outside the chamber 32, leads to an increased floor-projected area of the entire apparatus. Moreover, the positional precision of the Y table 31 could be affected by the change of thrust point in the Y table 31 in accordance with the movement of the X table 30.

SUMMARY OF THE INVENTION

The object of the present invention is to solve these problems and to provide a thin and low-vibration XY stage that can move fast and can be used within a chamber in which a specific atmosphere or vacuum is maintained without changing the floor-projected area of the apparatus.

In accordance with the invention, a two axis stage for microscopes is provided, comprising a first table on which a sample is placed and that can be moved in a first direction, a second table that guides the first table in the first direction and that can be moved in a second direction perpendicular to the first direction, a base that guides the second table in the second direction, and a drive mechanism for independently driving the first table and the second table. The two axis stage further comprises a third table disposed on the base, the third table being movable in the first direction using the drive mechanism for moving the first table. Additionally, a connecting member movable in the second direction is disposed on the third table. The connecting member is connected with the first table from beneath the second table.

Also, in accordance with the invention, a two axis stage for microscopes is provided, comprising a first table on which a sample is placed and that can be moved in a first direction by a first feed screw, a second table that guides the first table in the first direction and that can be moved in a second direction perpendicular to the first direction by a second feed screw, and a base that guides the second table in the second direction. The two axis stage further comprises a third table disposed on the base that can be moved in the first direction by the first feed screw. The second feed screw is located towards the edge of the base in the first direction with respect to the center of the base. The first feed screw is located so as not to intersect the second feed screw when projected on a plane of stage movement. And the third table is connected with the first table via a connecting member from beneath the second table, the connecting member being movable in the second direction.

Moreover, in accordance with the invention, in the two axis stage for microscopes, the connecting member connected with the first table is passed through a perforation provided in the second table and extending in the first direction.

With these structures, the total height of the stage and the height of gravitational center of the stage become lower, so that a thin and low-vibration sample stage can be realized. Also, the weight to be moved is reduced and the transportation speed of the stage can be increased. Furthermore, as the lateral difference in the second direction between the first table and the first feed screw is eliminated by the connecting member provided in the third table that can be moved in the second direction, the stage can be used inside a chamber in which a specific atmosphere or vacuum is maintained without changing the floor-projected area.

DESCRIPTION OF THE PREFERRED EMBODIMENTS

Figure 1:
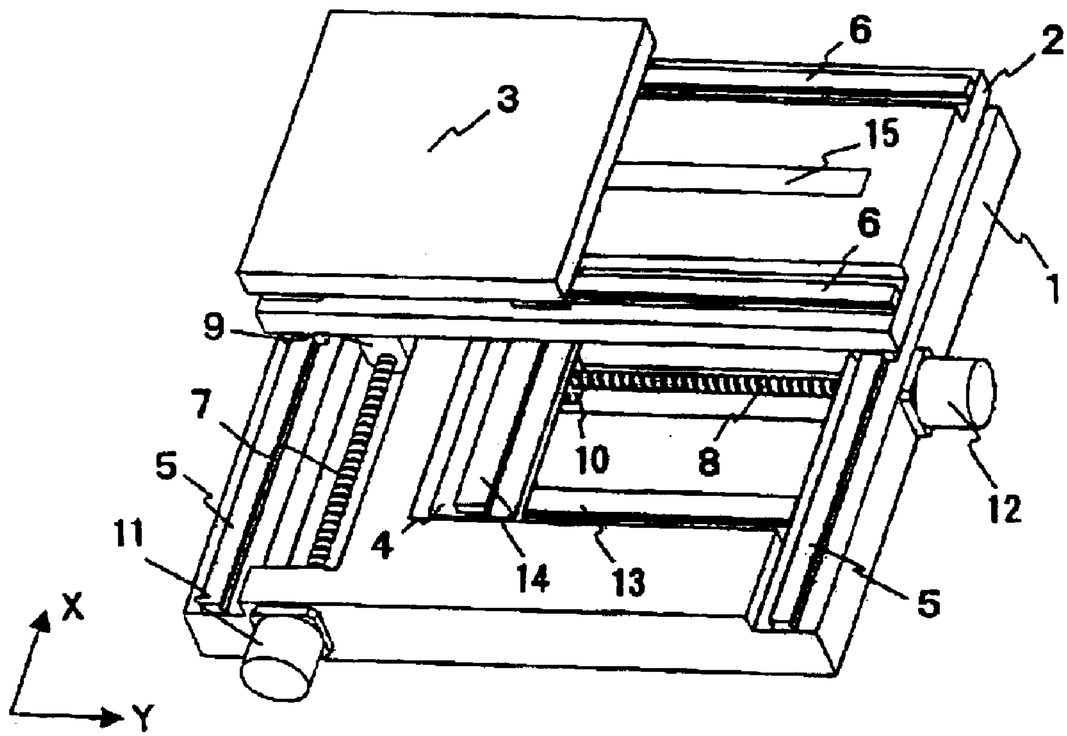
FIG. 1 is an oblique perspective view that shows an XY stage as an embodiment of the present invention.
Figure 2:
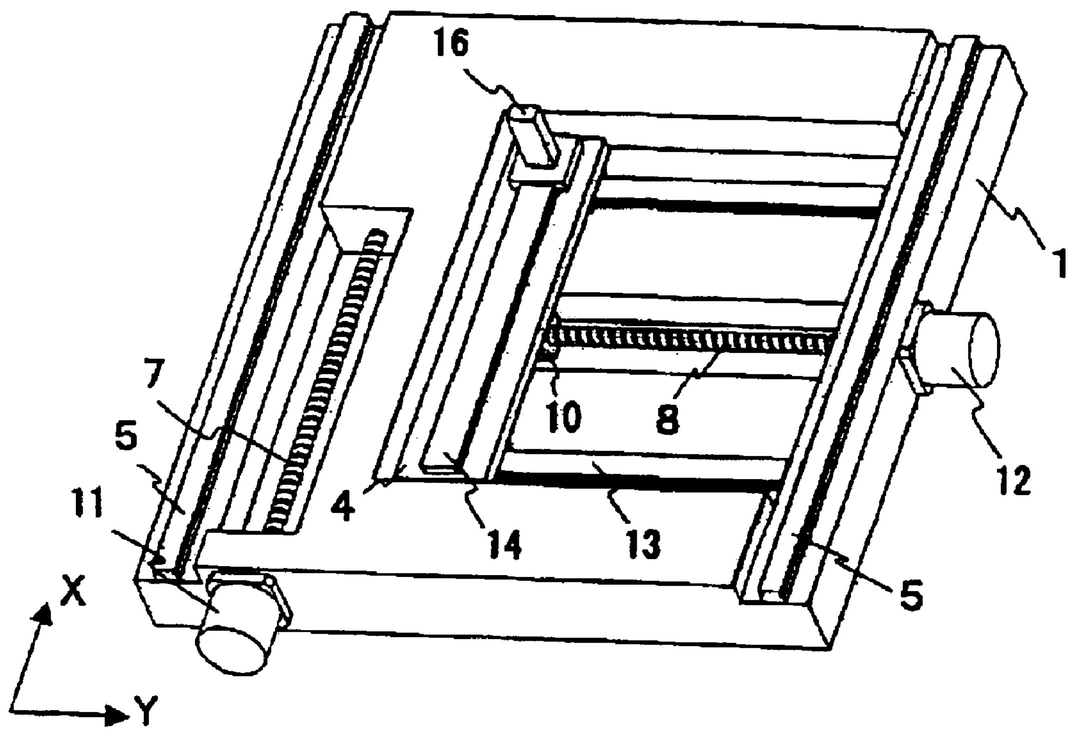
FIG. 2 is an oblique perspective view that shows an example of the base structure.

FIG. 1 is an oblique perspective view that shows a two axis (XY in the present example) stage for microscopes as an embodiment of the present invention. The XY stage comprises a base 1, an X table 2, an X guide unit 5 and a drive mechanism for moving the X table 2 in the X direction, a Y table 3 for mounting a sample, and a Y guide unit 6 for guiding the Y table 3 in the Y direction, a third table 4, and a drive mechanism. As shown in FIG. 2, feed screws 7 and 8 as means of driving the X table 2 and the Y table 3 are located in the base 1. By locating the X feed screw 7 towards the edge of the base 1 rather than at the center, a mount space for the Y feed screw 8 is provided and the screws can be located so as not to intersect each other in an XY plain view. Also, the third table 4 is disposed in the base 1. The third table 4 is guided by a guide unit 13 that is attached in parallel with the Y feed screw 8 and that can be moved in the Y direction. The third table 4 is connected with a Y nut unit 10 that is in threaded engagement with the Y feed screw 8. The third table 4 is provided with a slide unit 14 that can be moved in the X direction. The slide unit 14 is connected with the Y table 3, which is mounted on the X table 2, from beneath the X table 2. The Y table 3 is connected with the slide unit 14 via a connecting member 16 (FIG. 2) that is passed through a perforation 15 provided in the X table 2 and extending in the Y direction.

When a drive signal is sent to an X drive motor 11, the X feed screw 7 rotates so that the X table 2 can be moved forward and backward on the X axis along with the Y table 3 through the X nut unit 9. The connecting member 16 connecting the Y table 3 with the third table 4 is also slidable and moves together in the X direction on the slide unit 14 set on the third table 4. When a drive signal is sent to the Y drive motor 12, the Y feed screw 8 rotates so that the third table 4 can be moved forward and backward on the Y axis along with the Y table 3. The connecting member 16 moves along the perforation 15 provided in the X table 2 and extending in the Y direction.

Because of this structure, the drive mechanisms for both axes, which are relatively heavy, can be installed on the base 1, so that a sample fixed on the Y table 3 can be positioned speedily and precisely. Also, the height of gravitational center of the stage can become lower and the total height of the stage can also become lower, so that a thin and low-vibration XY stage can be realized.

Figure 3:
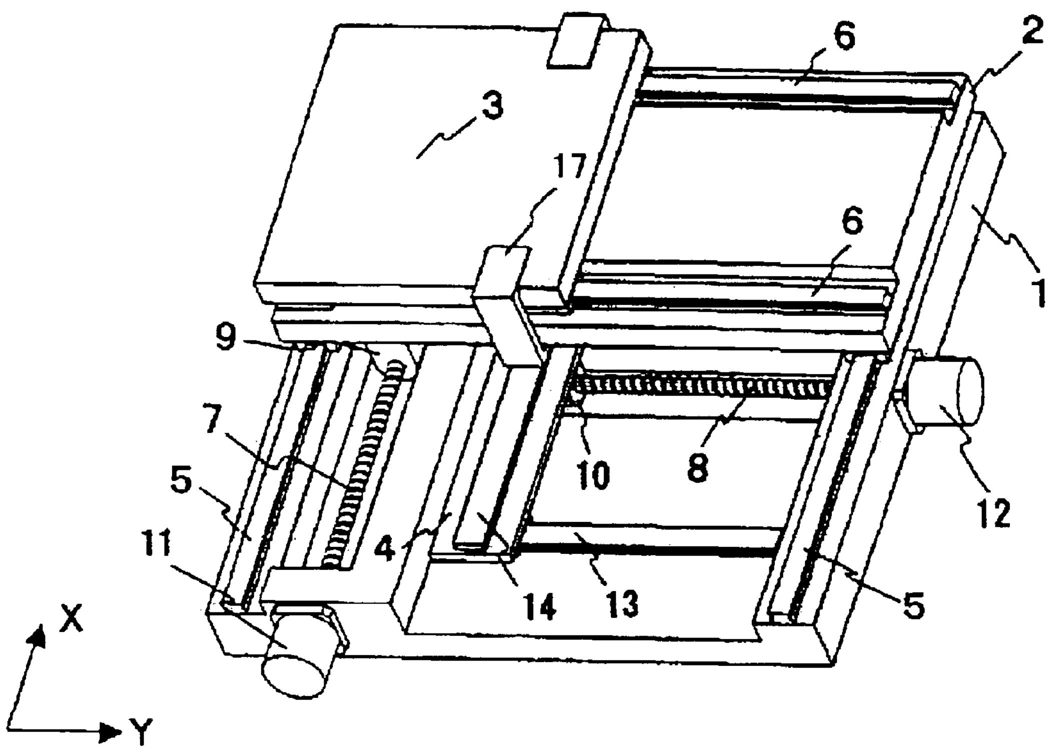
FIG. 3 is an oblique perspective view that shows an XY stage as another embodiment of the present invention.

FIG. 3 is an oblique perspective view that shows an XY stage as another embodiment of the present invention. In the embodiment, the perforation 15 extending in the Y direction is not provided in the second table 2. Instead, a connecting member 17 is set along the side of the second table 2. The effect of this embodiment is the same as the previous embodiment.

Figure 4:
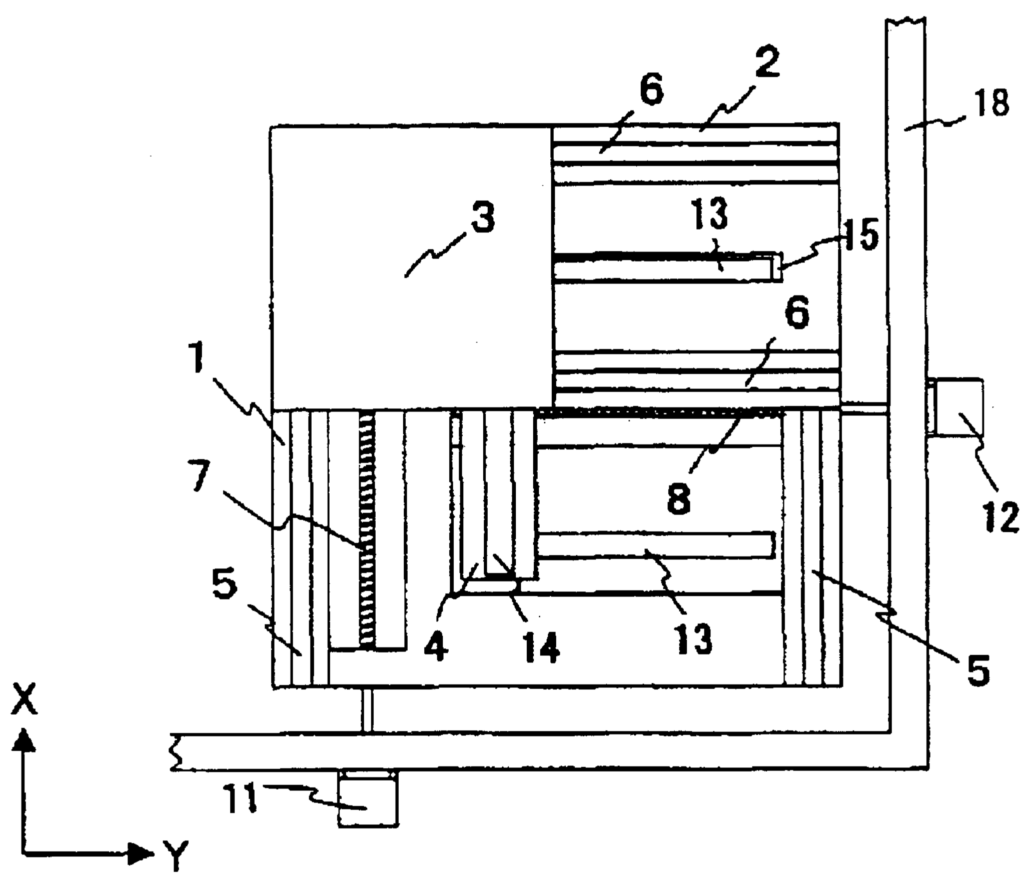
FIG. 4 shows an embodiment in which an XY stage according to the present invention is used inside a chamber in which a specific atmosphere or vacuum is maintained.
Figure 6:
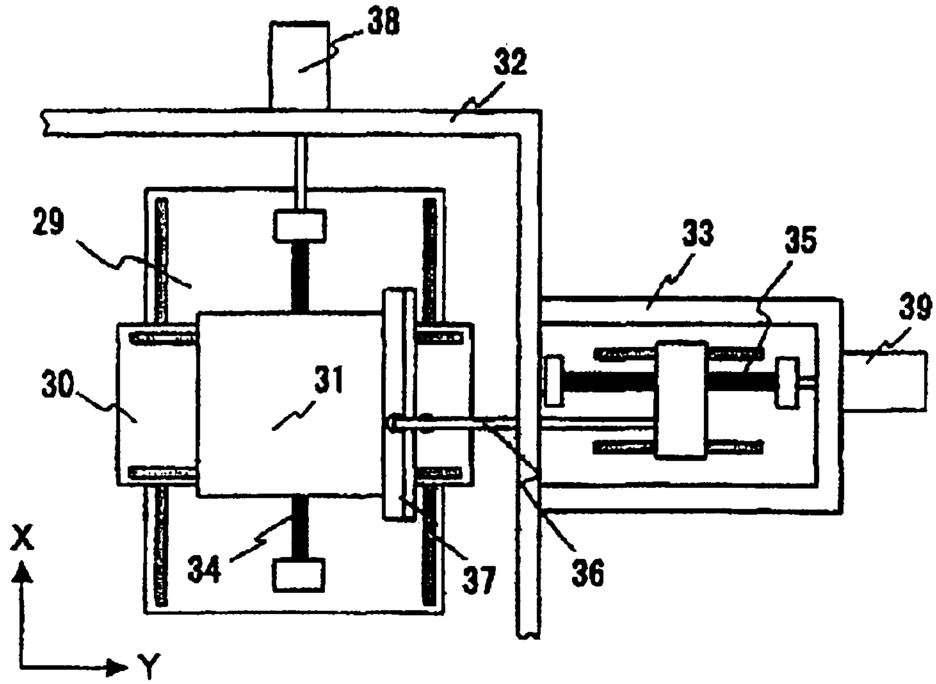
FIG. 6 shows a plan view of XY stage of the prior art.

FIG. 4 shows an embodiment in which the XY stage is located inside a chamber 18 in which a specific atmosphere or vacuum is maintained. The sub-chamber 33 shown in FIG. 6 is not required and the floor-projected area does not change because feed screws 7 and 8 for both axes are located inside the base 1. Also, the change of thrust point in the Y table 31 (FIG. 6) accompanying the movement of the X table 30 that is seen in the prior art does not occur, so that stable positional precision can be expected with little fluctuation in the stoke.

Figure 5:
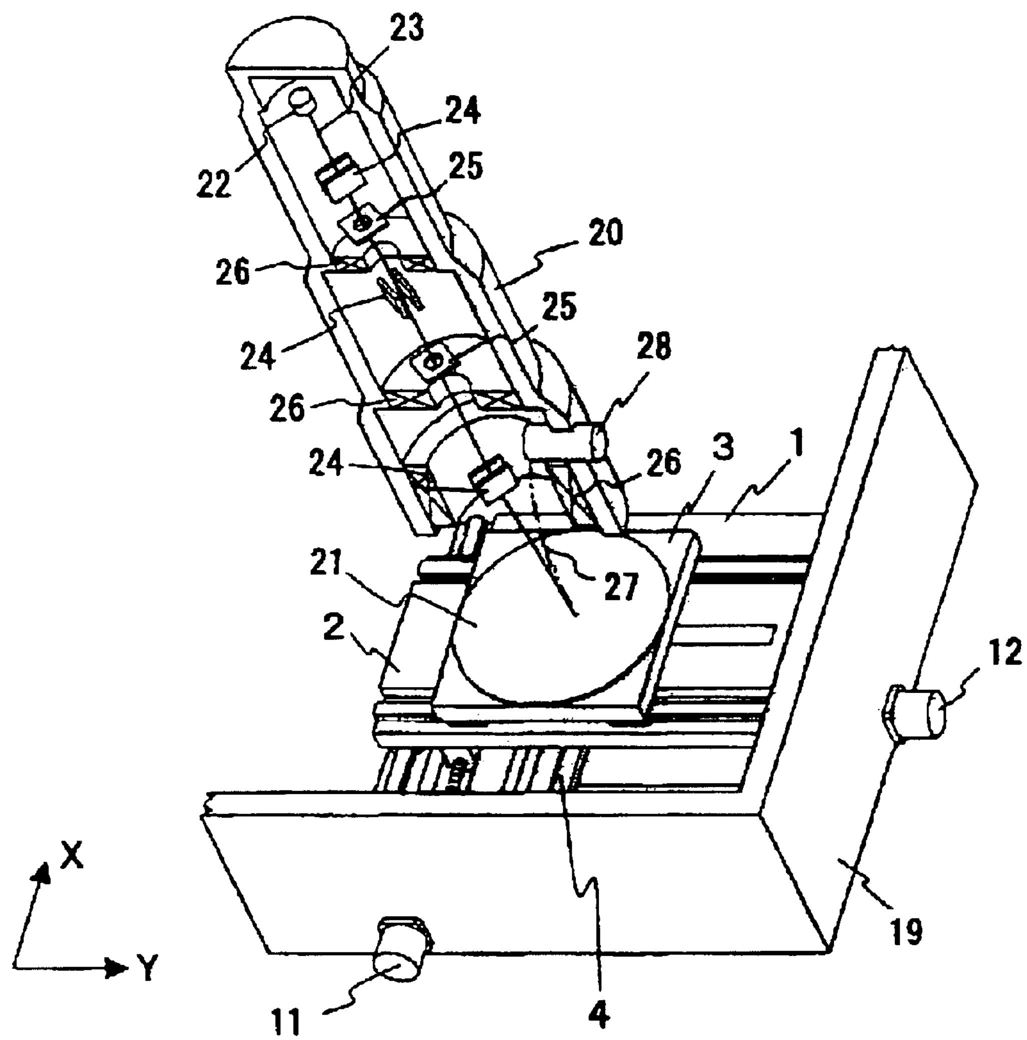
FIG. 5 shows an embodiment in which an XY stage according to the present invention is mounted on an electron microscope apparatus.

FIG. 5 shows an embodiment in which the XY stage is mounted on an electron microscope apparatus. The electron microscope apparatus deflects and focuses an electron beam 23 generated from a filament 22 inside a microscope tube 20 and irradiates it on the surface of a sample 21. A secondary electron detector 28 captures secondary electrons 27 that are generated from the sample 21 as a result of electron beam irradiation. An image display device displays a sample image based on the detected secondary electrons, although this is not shown in the figure. Numeral 24 designates a deflector, numeral 25 an aperture, and numeral 26 an electron lens. The insides of a sample chamber 19 and the microscope tube 20 are maintained at a vacuum. According to the present invention, the height of gravitational center of the stage can be reduced and the total height of the stage can also be reduced. Thus a thin and low-vibration XY stage can be provided, in which the amplitude of vibration of the stage caused by disturbance and the like can be reduced and their influence on the sample image can also be reduced, improving the image resolution as a result. Device throughput, which is regarded as important especially in the field of semiconductor device production and inspection, for example, can be improved, because precise and speedy stage positioning is possible.

The two axis stage for microscopes comprising a base and stages movable in the X and Y directions in accordance with the invention as described above, provides the following effects:

(1) The weight to be moved is reduced and the transportation speed of the stage can be increased because the heavy drive mechanisms for both axes are mounted on the base using the third table. Moreover, a thin and low-vibration XY stage can be realized because the total height of the stage and the height of gravitational center of the stage become lower.

The two axis stage can be used inside a chamber in which a specific atmosphere or vacuum is maintained without changing the floor-projected area because the lateral difference in the X direction between the Y table and the Y-direction feed screw is eliminated by a slide unit provided in the third table that can be moved in the X direction, for example. Also, stable positional precision can be expected with little fluctuation in the stroke because the change of thrust point in the Y table, as with the movement of the X table that is seen in the prior arts does not occur.

(3) When the XY stage is mounted on an electron microscope instrumentation, the amplitude of vibration of the stage due to disturbance and the like, can be reduced because of the thin and low-vibration structure of the XY stage. As a result, the influence of disturbance or the like on a sample image is reduced and the image resolution is improved. Moreover, device throughput, which is regarded as important especially in the field of semiconductor device production and inspection and the like, can be improved because precise and speedy stage positioning is possible.

What is claimed is:

1. A two axis stage for microscopes comprising:

a first table on which a sample is placed and that can be moved in a first direction;

a second table that guides said first table in said first direction and that can be moved in a second direction perpendicular to the first direction;

a base that guides said second table in said second direction; and a drive mechanism for independently driving said first table and second table, said two axis stage further comprising:

a third table disposed on said base, said third table being movable in said first direction using said drive mechanism for moving said first table; and a connecting member disposed on said third table and movable in said second direction, said connecting member being connected with said first table from beneath said second table.

2. A two axis stage for microscopes comprising:

a first table on which a sample is placed and that can be moved in a first direction by a first feed screw;

a second table that guides said first table in said first direction and that can be moved in a second direction perpendicular to said first direction by a second feed screw; and a base that guides said second table in said second direction, said two axis stage further comprising:

a third table disposed on said base that can be moved in said first direction by said first feed screw, wherein said second feed screw is located towards the edge of said base in said first direction with respect to the center of said base, wherein said first feed screw is located so as not to intersect said second feed screw when projected on a plane of stage movement, and wherein said third table is connected with said first table via a connecting member from beneath said second table, said connecting member being movable in said second direction.

3. The two axis stage for microscopes according to claim 1 or 2, wherein said connecting member is passed through a perforation provided in said second table and extending in said first direction.

4. The two axis stage for microscopes according to claim 3, wherein the stage is housed in a chamber, in which a specific atmosphere or vacuum is maintained, and wherein a motor as a drive means is fixed outside said chamber.

5. A charge particle beam apparatus comprising the two axis stage for microscopes according to claim 3.

6. The two axis stage for microscopes according to claim 1 or 2, wherein the stage is housed in a chamber, in which a specific atmosphere or vacuum is maintained, and wherein a motor as a drive means is fixed outside said chamber.

7. A charge particle beam apparatus comprising the two axis stage for microscopes according to claim 1 or 2.

* * * * *